(12) United States Patent
Liu et al.

(10) Patent No.: US 9,018,888 B2
(45) Date of Patent: Apr. 28, 2015

(54) SYSTEM AND METHOD FOR CONTROLLING A SYNCHRONOUS MOTOR

(71) Applicants: Yujing Liu, Ojersjo (SE); Hongyang Zhang, Vasteras (SE); Djordje Savinovic, Vasteras (SE)

(72) Inventors: Yujing Liu, Ojersjo (SE); Hongyang Zhang, Vasteras (SE); Djordje Savinovic, Vasteras (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 14/259,934

(22) Filed: Apr. 23, 2014

(65) Prior Publication Data

US 2014/0232317 A1     Aug. 21, 2014

Related U.S. Application Data

(63) Continuation of application No. PCT/EP2012/070098, filed on Oct. 11, 2012.

(30) Foreign Application Priority Data

Oct. 24, 2011   (EP) ..................... 11186290

(51) Int. Cl.
*H02P 1/50*       (2006.01)
*H02P 25/02*      (2006.01)

(52) U.S. Cl.
CPC ............... *H02P 1/50* (2013.01); *H02P 25/026* (2013.01)

(58) Field of Classification Search
USPC ......... 318/705, 712, 716, 717, 718, 724, 251, 318/532, 536
See application file for complete search history.

(56) References Cited

U.S. PATENT DOCUMENTS

| | | | |
|---|---|---|---|
| 3,354,368 A | | 11/1967 | Williamson |
| 3,463,987 A | * | 8/1969 | Schlicher et al. ............. 318/718 |
| 3,509,439 A | * | 4/1970 | Schicht ......................... 318/718 |
| 3,599,236 A | * | 8/1971 | Hutchins ...................... 318/718 |

(Continued)

FOREIGN PATENT DOCUMENTS

| | | |
|---|---|---|
| AT | 334469 B | 1/1976 |
| EP | 1071192 B1 | 9/2006 |

(Continued)

OTHER PUBLICATIONS

European Search Report Application No. 11 18 6290 Completed: Jun. 6, 2012; Mailing Date: Jun. 15, 2012 8 pages.

(Continued)

*Primary Examiner* — Bentsu Ro
*Assistant Examiner* — Thai Dinh
(74) *Attorney, Agent, or Firm* — St. Onge Steward Johnston & Reens LLC

(57) ABSTRACT

A synchronous electrical motor includes a rotor with a DC field winding. An exciter is configured to energize the DC field winding by generating a DC current in a first direction across the DC field winding when activated. A control system is configured to control a current flow across the DC field winding, the control system including a field discharge resistor and a by-passing circuitry. The by-passing circuitry is configured to implement a first by-passing to electrically by-pass the field discharge resistor during a current flow in the first direction across the DC field winding, and to implement a second by-passing to electrically by-pass the field discharge resistor during a current flow in a second direction across the DC field winding. The control system is able to direct all the DC current generated by the exciter to flow across the DC field winding.

12 Claims, 4 Drawing Sheets

(56) References Cited

U.S. PATENT DOCUMENTS

| | | | |
|---|---|---|---|
| 3,667,014 A * | 5/1972 | Merhof et al. | 318/715 |
| 3,959,702 A * | 5/1976 | Godwin et al. | 318/713 |
| 4,038,589 A * | 7/1977 | Heyne et al. | 318/718 |
| 4,315,202 A * | 2/1982 | Dawson et al. | 318/718 |
| 4,422,028 A * | 12/1983 | Godwin et al. | 318/718 |
| 6,047,104 A * | 4/2000 | Cheng | 388/835 |
| 6,111,390 A * | 8/2000 | Inaba et al. | 322/28 |
| 6,420,842 B1 * | 7/2002 | Gold | 318/141 |
| 6,965,173 B2 * | 11/2005 | Fukasaku et al. | 290/40 C |
| 8,044,633 B2 * | 10/2011 | Tatematsu et al. | 318/801 |

FOREIGN PATENT DOCUMENTS

| | | | |
|---|---|---|---|
| WO | 9320614 | A1 | 10/1993 |
| WO | 2010094818 | A1 | 8/2010 |

OTHER PUBLICATIONS

International Search Report and Written Opinion of the International Searching Authority Application No. PCT/EP2012/070098 Completed: Nov. 26, 2013; Mailing Date: Dec. 6, 2013 11 pages.

* cited by examiner

000# SYSTEM AND METHOD FOR CONTROLLING A SYNCHRONOUS MOTOR

FIELD OF THE INVENTION

The present invention generally relates to control of a synchronous motor during a starting period.

The invention is particularly, but not exclusively, suited for high power synchronous motors, e.g. having a power of 5-50 MW.

BACKGROUND OF THE INVENTION

A conventional synchronous motor has a stator with at least one alternating current (AC) stator winding and a rotor with at least one direct current (DC) field winding. Such a motor is normally started by an induction motor action whereby a damper winding or solid poles of the rotor correspond to a squirrel-cage of an induction motor, and with the DC field winding being unexcited. The rotor is accelerated with a torque thus produced until it reaches a rotating speed close to a synchronous speed. The DC field winding is excited with DC at a proper instant, and the motor then pulls into step. During the acceleration a relatively high voltage is induced in the DC field winding since it is rotating at a lower speed than the rotating field from the AC stator winding. In order to limit this voltage and to protect the insulation of the DC field winding, thyristors can be introduced to short circuit the DC field winding. This will cause a high current to flow through the DC field winding during the acceleration. This current will negatively influence the starting torque, and a field discharge resistor is commonly used to limit the current.

Synchronous motors of the above kind are thoroughly known in the art, see e.g. EP 1 071 192 B1; U.S. Pat. No. 3,354,368; U.S. Pat. No. 3,959,702; U.S. Pat. No. 4,038,589; and U.S. Pat. No. 4,422,028.

AT334469 discloses a field discharge resistor that is by-passed when the voltage across it exceeds a predetermined threshold value. The field discharge resistor according to AT334469 keeps causing losses during synchronous operation of the motor when the DC field winding is energized with DC.

In the conventional practice, a starting resistor is separately mounted either on the rotor of the machine itself or, in some cases, externally of the motor. In either case, the starting resistors used heretofore are relatively large, heavy and expensive. The power of a typical rotating starting resistor may be 1 MW for a 20 MW motor, and even though the in-duty time is short, e.g. 10-20 seconds, large amount of thermal energy is dissipated. A certain weight of the resistance material is required to avoid overheating of the starting resistor since the cooling time is too short to transfer away the heat from the starting resistor.

Further, the necessary mounting provisions and space requirements complicate the mechanical design, especially when the starting resistor is mounted on the rotor. This is a particular disadvantage in the case of brushless synchronous motors, where the excitation system and starting control are carried entirely on the rotor, and the necessity for also mounting the starting resistor on the rotor involves considerable difficulty and results in rotors of large size and high cost.

SUMMARY OF THE INVENTION

One object of the invention is to provide an improved synchronous electrical motor.

A further object of the invention is to provide an improved method for starting a synchronous electrical motor.

These objects may be achieved by a synchronous electrical motor and a method for starting a motor.

The invention is based on the realization that by connecting a field discharge resistor only at a higher speed range e.g. about 85-95% of the synchronous speed of the motor instead of connecting the field discharge resistor under the whole acceleration period, the duty time of the field discharge resistor can be reduced by a factor of about 3-10. The size and the weight of the field discharge resistor will be reduced in the similar proportion. It has furthermore been realized that with an appropriate topology of the control system losses arising from the field discharge resistor during a steady state operation of the machine can be avoided.

According to a first aspect of the invention, there is provided a synchronous electrical motor comprising a rotor with a DC field winding, an exciter configured to energize the DC field winding by generating a DC current in a first direction across the DC field winding when activated, and a control system configured to control a current flow across the DC field winding. The control system comprises a field discharge resistor and a by-passing circuitry. The by-passing circuitry is configured to implement a first by-passing to electrically by-pass the field discharge resistor during a current flow in the first direction across the DC field winding. The by-passing circuitry is further configured to implement a second by-passing to electrically by-pass the field discharge resistor during a current flow in a second direction across the DC field winding. The second direction is opposite to the first direction. The control system is able to direct all the DC current generated by the exciter to flow across the DC field winding. Any DC current generated by the exciter but not flowing across the DC field winding represents losses, and directing all the DC current generated by the exciter to flow across the DC field winding is therefore essential in avoiding losses. With an appropriate topology of the control system any losses caused by the field discharge resistor during the steady state operation of the machine can be avoided. In the context of this invention, "all the DC current" is to be interpreted as "substantially all DC current", which more precisely means at least 95% of the DC current generated by the exciter, such as at least 97%, at least 98% or at least 99% of the DC current generated by the exciter.

According to one embodiment of the invention, the by-passing circuitry is able to implement the first by-passing and the second by-passing independently from each other. By this measure, a flexible by-passing operation is achieved.

According to one embodiment of the invention, the by-passing circuitry is configured to implement the first by-passing and the second by-passing in response to a frequency or to an amplitude of a voltage induced in the DC field winding. The frequency and the amplitude of a voltage induced in the DC field winding are found out to be good criteria for deciding an appropriate instant for switching the field discharge resistor into, and out of, duty, respectively.

According to one embodiment of the invention, the by-passing circuitry is configured to implement the first by-passing and the second by-passing in response to rotating speed of the rotor. The rotating speed of the rotor is found out to be a good criterion for deciding an appropriate instant for switching the field discharge resistor into, and out of, duty, respectively.

According to one embodiment of the invention, the by-passing circuitry is configured to implement at least one of the first by-passing and the second by-passing continuously over the whole rotating speed range when the rotating speed is between 0% and at least 50% of a synchronous speed of the rotor, such as between 0% and at least 70%, between 0% and at least 80%, between 0% and at least 85%, between 0% and at least 90% or between 0% and at least 95% of the synchronous speed. It has been found that the field discharge resistor has less significance at the lower range of the rotating speed.

According to one embodiment of the invention, the by-passing circuitry is configured to block the current flow in the second direction across the DC field winding when the rotating speed is at least 90% of the synchronous speed, such as at least 95% of the synchronous speed, and the exciter is not activated. When the rotating speed approaches the synchronous speed, the frequency of a pulsating torque resulting from the oscillating current flow across the DC field winding becomes low. By blocking the current flow in the second direction the corresponding braking effect is removed.

According to a second aspect of the invention, there is provided a method for starting a synchronous electrical motor comprising a rotor with a DC field winding, an exciter configured to energize the DC field winding by generating a DC current in a first direction across the DC field winding when activated, and a field discharge resistor electrically connected to the DC field winding. The method comprises the steps of: implementing a first by-passing of the field discharge resistor during a current flow in the first direction across the DC field winding when the exciter is not activated; activating the exciter; and directing all the DC current generated by the exciter to flow across the DC field winding. Any DC current generated by the exciter but not flowing across the DC field winding represents losses, and directing all the DC current generated by the exciter to flow across the DC field winding is therefore essential in avoiding losses. With an appropriate topology of the control system any losses caused by the field discharge resistor during the steady state operation of the machine can be avoided.

According to one embodiment of the invention, the method further comprises the step of implementing a second by-passing of the field discharge resistor during a current flow in a second direction across the DC field winding when the exciter is not activated. The second direction is opposite to the first direction. While the duty time of the field discharge resistor is reduced to a half by a unidirectional by-passing, by a bidirectional by-passing the duty time is brought to zero, thereby allowing the size and the weight of the field discharge resistor to be further reduced.

According to one embodiment of the invention, the first by-passing and the second by-passing are implemented independently from each other. By this measure, a flexible by-passing operation is achieved.

According to one embodiment of the invention, the first by-passing and the second by-passing are implemented in response to a frequency or to an amplitude of a voltage induced in the DC field winding. The frequency and the amplitude of a voltage induced in the DC field winding are found out to be good criteria for deciding an appropriate instant for switching the field discharge resistor into, and out of, duty, respectively.

According to one embodiment of the invention, the first by-passing and the second by-passing are implemented in response to rotating speed of the rotor. The rotating speed of the rotor is found out to be a good criterion for deciding an appropriate instant for switching the field discharge resistor into, and out of, duty, respectively.

According to one embodiment of the invention, the method further comprising the step of implementing at least one of the first by-passing and the second by-passing at least temporarily when the rotating speed is between 0% and at most 95% of a synchronous speed of the rotor, such as between 0% and at most 90%, between 0% and at most 85%, between 0% and at most 80%, between 0% and at most 70% or between 0% and at most 50% of the synchronous speed. It has been found that the field discharge resistor has less significance at the lower range of the rotating speed.

According to one embodiment of the invention, the method further comprising the step of blocking the current flow in the second direction across the DC field winding when the rotating speed is at least 90% of the synchronous speed, such as at least 95% of the synchronous speed, and the exciter is not activated. When the rotating speed approaches the synchronous speed, the frequency of a pulsating torque resulting from the oscillating current flow across the DC field winding becomes low. By blocking the current flow in the second direction the corresponding braking effect is removed.

BRIEF DESCRIPTION OF THE DRAWINGS

The invention will be explained in greater detail with reference to the accompanying drawings, wherein.

DETAILED DESCRIPTION OF THE INVENTION

Referring to FIG. 1, a synchronous electrical motor comprises a stator with an AC stator winding 12 and a rotor with a DC field winding 13. For the purpose of explaining the present invention, the operation of the motor is divided into two phases: a starting period and a steady state operation. The starting period starts when the motor is at standstill, and ends when an exciter 16 is activated to energize the DC field winding 13. During the starting period the exciter 16 is not activated. During the steady state operation the motor rotates at a synchronous speed or at least close to the synchronous speed, and the activated exciter 16 generates a DC current across the DC field winding 13. The exciter 16 comprises a rectifier modulating a three-phase AC current into a DC current. The AC stator winding 12 is energized with AC both during the starting period and during the steady state operation, and generates a rotating magnetic field within the stator. A control system 11 for controlling a current flow across the DC field winding 13 comprises a starting resistor R, three thyristors T1, T2 and T3, and a free-wheeling diode bridge D1-D6.

Figure 2A:
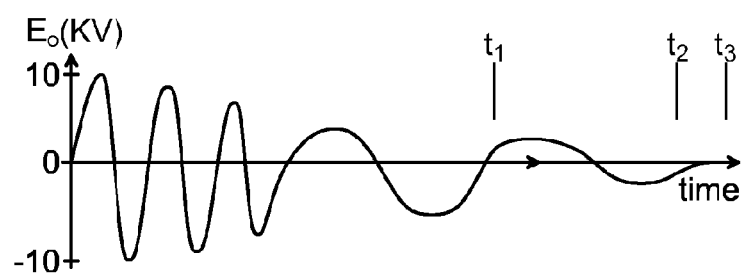
FIGS. 2a-2b illustrate oscillations in the DC field winding during a starting period of a synchronous motor.
Figure 2B:
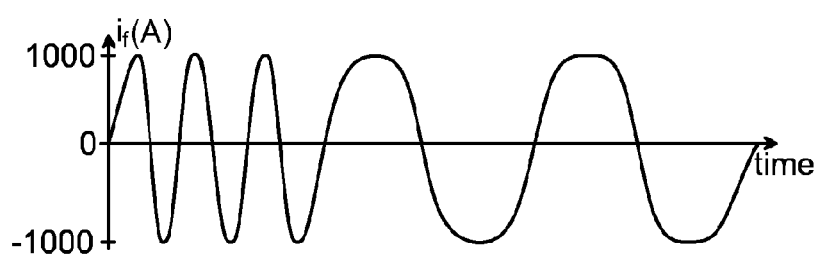

Referring to FIG. 2a, during the asynchronous starting period the induced voltage $E_O$ across the DC field winding 13 is an AC voltage with an oscillating frequency equal to a slip frequency, and with an amplitude decreasing with increasing rotor speed. FIG. 2b shows the induced current $i_f$ through the DC field winding 13 during the starting period. The induced voltage and the induced current comprise respective positive and negative half cycles.

Figure 1A:
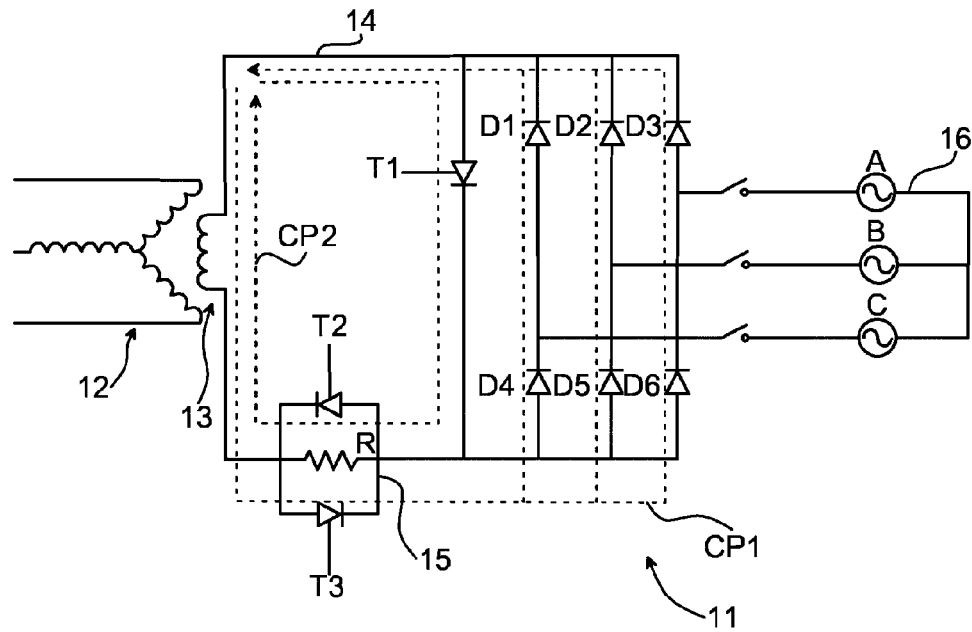
FIGS. 1a-1c illustrate controlling of a synchronous motor during different parts of a starting period according to one embodiment of the invention.

The starting period is further divided into three consecutive parts, a first part, a second part and a third part. In the beginning of the first part the rotor is at standstill, and during the first part the rotor is accelerated exclusively by an induction motor action. FIG. 1a illustrates the situation during the first part, according to one embodiment of the invention. During the positive half cycle of the induced voltage the obtained first current path CP1 passes the thyristor T3, the free-wheeling diode bridge D1-D6 and the DC field winding 13. The thyristor T3 is controlled by a frequency dependent circuit. During the negative half cycle of the induced voltage, the thyristor T1 is triggered based on a pre-set voltage which is usually much lower than the maximum induced voltage. The obtained second current path CP2 passes the thyristors T1 and T2, and the DC field winding 13. The thyristor T2 is also controlled by a frequency dependent circuit. Thus, according to the embodiment of FIG. 1a, the starting resistor R is by-passed during the first part of the starting period, both during the negative half cycle and during the positive half cycle of the induced voltage.

When the rotor reaches a certain speed, the frequency of the induced voltage drops below a pre-set value, and a second part of the starting period begins. According to the embodiment of FIG. 1b, the thyristors T2 and T3 are not triggered any more, and the field discharge resistor R is thus switched into duty. One purpose of introducing the field discharge resistor R is to lift the starting torque in the end of the starting period to handle a heavy load condition. The obtained third current path CP3 passes the field discharge resistor R, the free-wheeling diode bridge D1-D6 and the DC field winding 13 during the positive half cycle of the induced voltage. During the negative half cycle of the induced voltage, the obtained fourth current path CP4 passes the thyristor T1, the field discharge resistor R and the DC field winding 13.

When the rotor reaches a certain speed, the amplitude of the induced voltage drops below a second pre-set value, and a third part of the starting period begins. According to the embodiment of FIG. 1c, the thyristor T1 is blocked and the thyristor T3 will remain blocked. Consequently, the control system 11 only provides a fifth current path CP5 for the current flowing during the positive half cycle of the induced voltage. The fifth current path CP5 passes the field discharge resistor R, the free-wheeling diodes D1-D6 and the DC field winding 13. During the negative half cycle of the induced voltage the current is blocked.

It shall be appreciated that according to alternative embodiments of the invention, the thyristors T1, T2 and T3 may be triggered to conduct at other instants than indicated hereinbefore. FIGS. 3a-3d illustrate exemplary on-off patterns for the thyristors T1-T3. The first part of the starting period begins at 0 and ends at $t_1$, the second part of the starting period begins at $t_1$ and ends at $t_2$, the third part of the starting period begins at $t_2$ and ends at $t_3$, and the steady state operation begins at $t_3$. The time instants $t_1$-$t_3$ are also indicated in the oscillogram of FIG. 2a.

Thus, the thyristor T3 may be triggered to conduct during the third part of the starting period, thus by-passing the field discharge resistor R during this part. The current then flows through the thyristor T3, the free-wheeling diodes D1-D6 and the DC field winding 13. During the negative half cycle of the induced voltage the current is blocked.

Figure 3A:
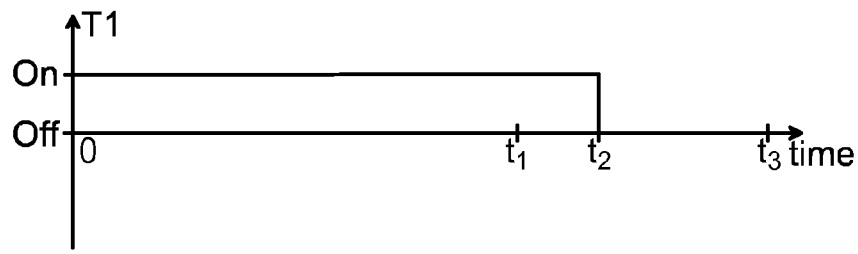
FIGS. 3a-3d show on-off patterns for different thyristors according to one embodiment of the invention.
Figure 3B:
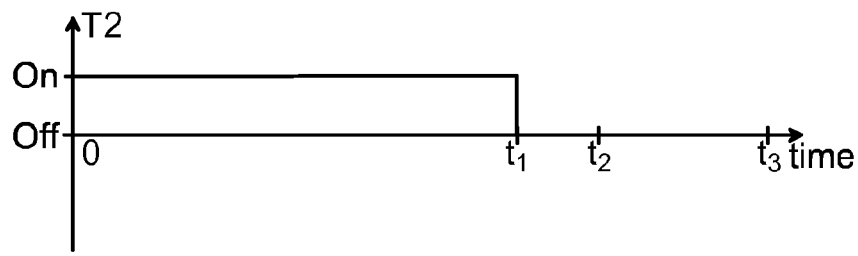
Figure 3C:
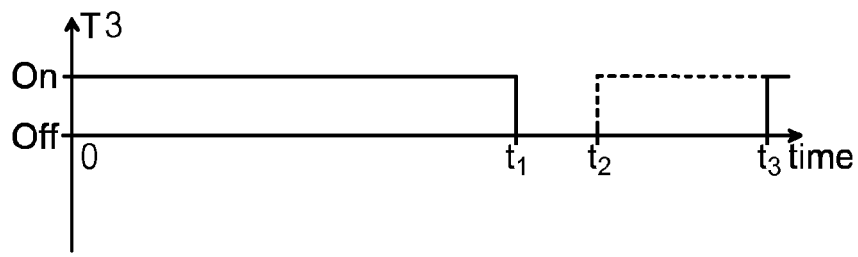
Figure 3D:
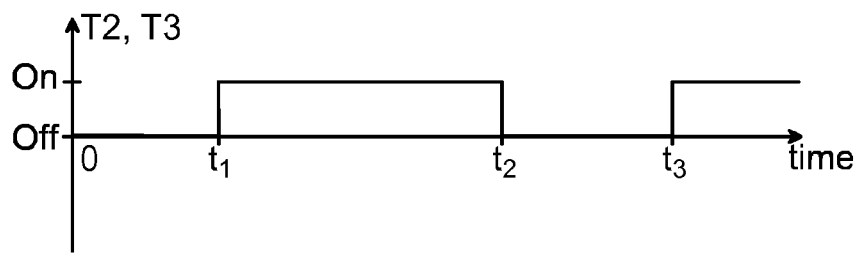

The thyristors T2 and T3 may also be triggered as illustrated in FIG. 3d. Here, the thyristors T2 and T3 are blocked during the first and third parts of the starting period, and are triggered to conduct during the second part of the starting period and during the steady state operation. Actually, the thyristor T2 does not have to be triggered to conduct during the steady state operation since the thyristor T1 is blocked and prevents efficiently current from flowing during the negative half cycle of the induced voltage. Hereby, current is forced to flow through the field discharge resistor R during the first and third parts of the starting period. Note that according to this embodiment the various parts of the starting period may begin and end at other points of time than in previous embodiments.

The starting period ends when the DC excitation from the exciter 16 is switched to the DC field winding 13 through the diode bridge D1-D6 to provide a constant synchronizing torque for the steady state operation. The thyristor T3 is triggered to conduct by the DC voltage, and the field discharge resistor R is by-passed. This may be performed at a certain time delay after the third part of the starting period has ended.

According to an alternative embodiment of the invention, the thyristor T3 is blocked during the steady state operation, and instead a further thyristor (not illustrated) connected in parallel with the thyristor T3 is triggered to conduct, thus by-passing the field discharge resistor R. This alteration requires one further thyristor but will not affect the overall performance of the system.

The thyristors T2 and T3 (and optionally the thyristor connected in parallel with thyristor T3) can be triggered in a plurality of manners (not only by frequency) as long as the conducting and non-conducting states can be controlled as indicated in FIGS. 3b-3d and described above.

The second part of the starting period may begin when the speed of the rotor of the synchronous motor is at least about 50%, preferably at least about 70%, more preferably at least about 80%, more preferably at least about 85%, and most preferably about 90%, of the synchronous speed of the motor.

The second part of the starting period may end when the speed of the rotor of the synchronous motor is at least about 90%, preferably at least about 95%, of the synchronous speed of the motor.

The third part of the starting period may end when the speed of the rotor of the synchronous motor is at least about 90%, preferably at least about 95% of the synchronous speed of the motor, but after the second part of the starting period ends. The third part of the starting period may end at a given time delay after the second part of the starting period has ended (and the third part has begun).

Figure 4A:
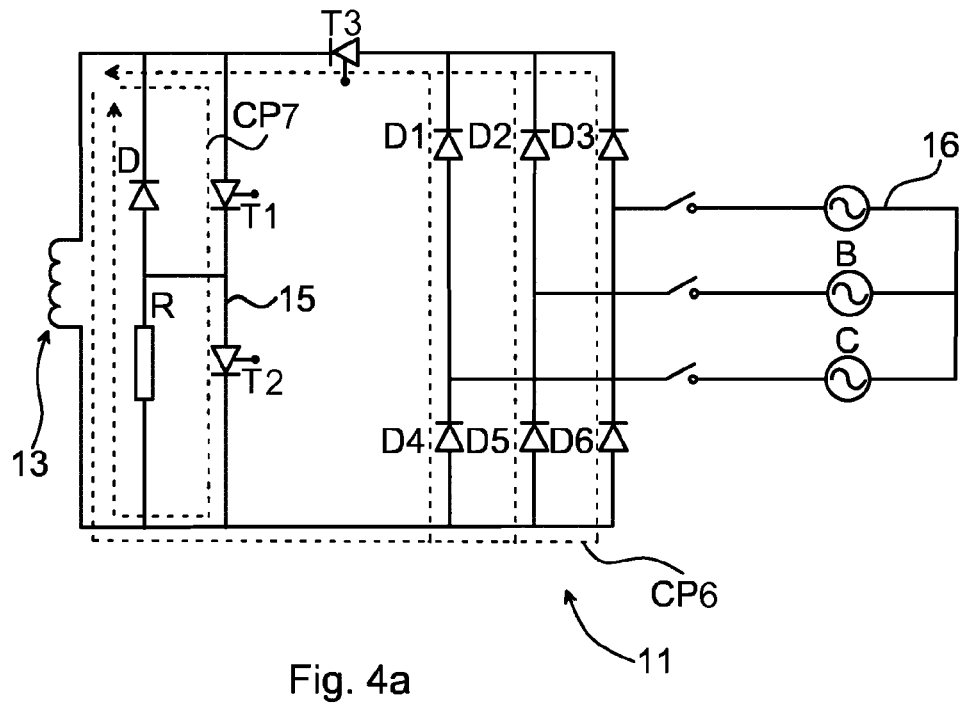
FIGS. 4a-4b show control systems according to alternative embodiments of the invention.
Figure 4B:
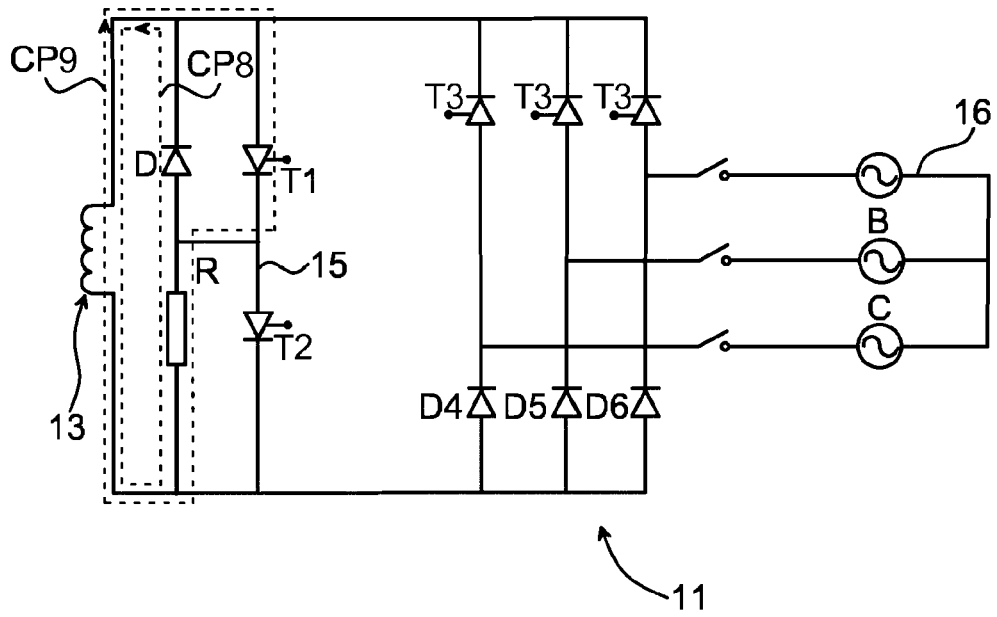

FIGS. 4a and 4b show alternative control systems 11 for controlling a current flow across the DC field winding 13. The system of FIG. 4a introduces the principles of the present invention into a control system as disclosed in U.S. Pat. No. 3,959,702, the contents of which being hereby incorporated by reference. Here, the thyristors T1, T2 and T3 are triggered as being illustrated in FIGS. 3a-c. During the first part of the starting period the obtained sixth current path CP6 passes the diode bridge D1-D6, the thyristor T3 and the DC field winding 13 during the positive half cycle of the induced voltage. During the negative half cycle of the induced voltage, the obtained seventh current path CP7 passes the thyristors T1 and T2, and the DC field winding 13.

During the second part of the starting period thyristors T2 and T3 are blocked. The obtained eighth current path CP8 (see FIG. 4b) passes the field discharge resistor R, a diode D and the DC field winding 13 during the positive half cycle of the induced voltage. During the negative half cycle of the induced voltage the obtained ninth current path CP9 (see FIG. 4b) passes the thyristor T1, the field discharge resistor R and the DC field winding 13.

During the third part of the starting period the thyristor T1 is blocked and the thyristor T3 may be triggered to conduct or be blocked. In the former case, a current path is provided during the positive half cycle of the induced voltage to allow current to flow through the diode bridge D1-D6, the thyristor T3 and the DC field winding 13. In the latter case, a current path is provided during the positive half cycle of the induced voltage to allow current to flow through the field discharge resistor R, the diode D and the DC field winding 13. During the negative half cycle of the induced voltage the diode D and the thyristors T1 and T3 are blocking the current.

During the steady state operation the DC excitation from the exciter 16 is switched to the DC field winding 13 through the diode bridge D1-D6. The thyristor T3 is triggered to conduct by the DC voltage, and the field discharge resistor R is by-passed. This may, as before, be performed at a certain time delay after the third part of the starting period has ended.

The system of FIG. 4b introduces the principles of the present invention into a control system as disclosed in U.S. Pat. No. 3,354,368, the contents of which being hereby incorporated by reference. This embodiment differs from the embodiment of FIG. 4a only in that the thyristor T3 and the upper diodes D1-D3 of the diode bridge are exchanged for three thyristors T3 (triggered as thyristor T3 of FIG. 4a). This embodiment will operate similar to the embodiment of FIG. 4a.

Figure 1B:
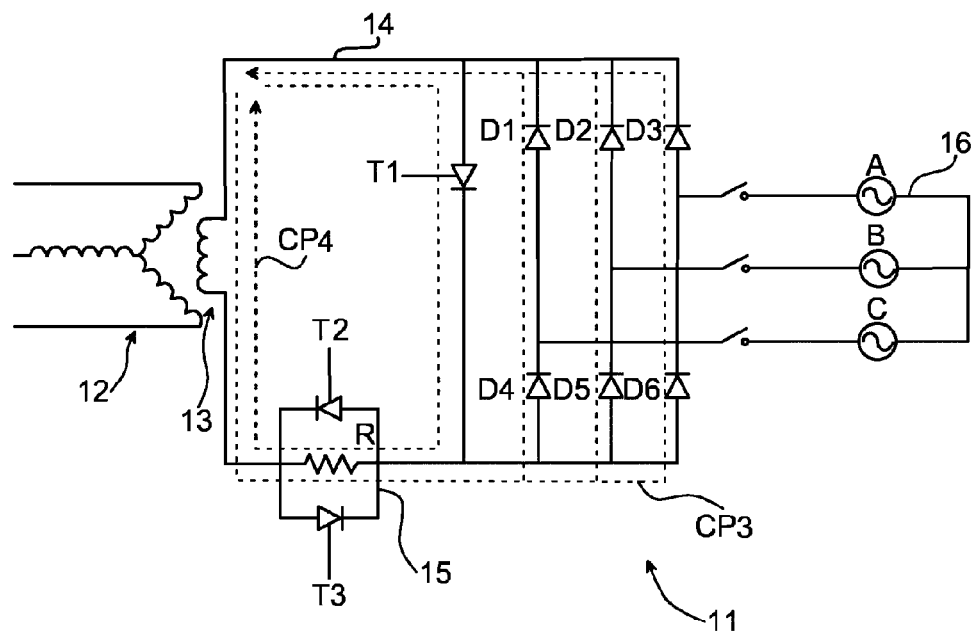
Figure 1C:
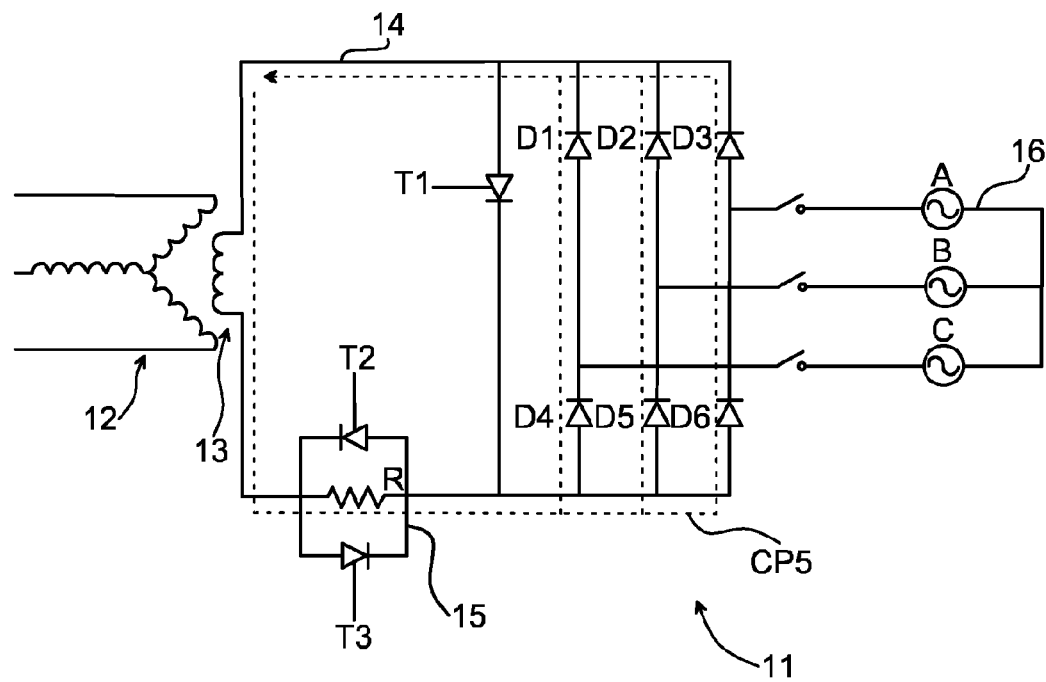

According to yet alternative embodiments of the invention the thyristors T2 and T3 of FIGS. 1a-c are exchanged for a bidirectional switching device, such as e.g. a TRIAC, the operation of which would correspond to the operation of the combination of the thyristors T2 and T3.

The method for starting a synchronous electrical motor according to the present invention can be implemented with a still further embodiment wherein the thyristor T2 of FIGS. 1a-c would be dispensed with, and the by-passing of the field discharge resistor R is made in one current direction only. In such instance, the field discharge resistor R would be electrically unidirectionally by-passed during selected parts of the starting period. During the first and second parts of the starting period (when current is enabled in both directions by means of the thyristor T1) the unidirectional by-passing would imply that the current would flow through the field discharge resistor R during the negative half cycle of the induced voltage. During the positive half cycle of the induced voltage the current would flow through the thyristor T3 if the by-passing is activated, and through the field discharge resistor R if the by-passing is deactivated. During the third part of the starting period (when current is disabled in one direction by means of the thyristor T1) the current would only flow during the positive half cycle of the induced voltage.

The invention is not limited to the embodiments shown above, but the person skilled in the art may modify them in a plurality of ways within the scope of the invention as defined by the claims.

What is claimed is:

1. A synchronous electrical motor comprising:
   a rotor with a DC field winding,
   an exciter configured to energize the DC field winding by generating a DC current in a first direction across the DC field winding when activated, and
   a control system configured to control a current flow across the DC field winding, the control system comprising a field discharge resistor and a by-passing circuitry configured to implement a first by-passing to electrically by-pass the field discharge resistor during a current flow in the first direction across the DC field winding, and to implement a second by-passing to electrically by-pass the field discharge resistor during a current flow in a second direction across the DC field winding, the second direction being opposite to the first direction, and the control system being able to direct all the DC current generated by the exciter to flow across the DC field winding,
   wherein the control system is further configured to short circuit the DC field winding during a current flow both in the first direction and in the second direction across the DC field winding.

2. The synchronous electrical motor according to claim 1, wherein the by-passing circuitry is able to implement the first by-passing and the second by-passing independently from each other.

3. The synchronous electrical motor according to claim 1, wherein the by-passing circuitry is configured to implement the first by-passing and the second by-passing in response to a frequency or to an amplitude of a voltage induced in the DC field winding.

4. The synchronous electrical motor according to claim 1, wherein the by-passing circuitry is configured to implement the first by-passing and the second by-passing in response to rotating speed of the rotor.

5. The synchronous electrical motor according to claim 4, wherein the by-passing circuitry is configured to implement at least one of the first by-passing and the second by-passing continuously over the whole rotating speed range when the rotating speed is between 0% and at least 95% of a synchronous speed of the rotor.

6. The synchronous electrical motor according to claim 1, wherein the by-passing circuitry is configured to block the current flow in the second direction across the DC field winding when the rotating speed is at least 90% of the synchronous speed, and the exciter is not activated.

7. A method for starting a synchronous electrical motor comprising a rotor with a DC field winding, an exciter configured to energize the DC field winding by generating a DC current in a first direction across the DC field winding when activated, and a field discharge resistor electrically connected to the DC field winding, the method comprising the steps of:
   short circuiting the DC field winding through the field discharge resistor during a current flow in the first direction across the DC field winding when the exciter is not activated;
   implementing a first by-passing of the field discharge resistor during a current flow in the first direction across the DC field winding when the exciter is not activated;
   implementing a second by-passing of the field discharge resistor during a current flow in a second direction across the DC field winding when the exciter is not activated, the second direction being opposite to the first direction;
   activating the exciter; and
   directing all the DC current generated by the exciter to flow across the DC field winding.

8. The method according to claim 7, wherein the first by-passing and the second by-passing are implemented independently from each other.

9. The method according to claim 7, wherein the first by passing and the second by-passing are implemented in response to a frequency or to an amplitude of a voltage induced in the DC field winding.

10. The method according to claim 7, wherein the first by-passing and the second by-passing are implemented in response to rotating speed of the rotor.

11. The method according to claim 7, the method further comprising the step of:
    implementing at least one of the first by-passing and the second by-passing at least temporarily when the rotating speed is between 0% and at most 95% of a synchronous speed of the rotor.

12. The method according to claim 7, the method further comprising the step of:

blocking the current flow in a second direction across the DC field winding when the rotating speed is at least 90% of the synchronous speed, and the exciter is not activated.

* * * * *